United States Patent
Lordello

(10) Patent No.: US 8,074,270 B1
(45) Date of Patent: Dec. 6, 2011

(54) AUTOMATIC CONFIGURATION OF NETWORK TUNNELS

(75) Inventor: Claudio Lordello, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 1061 days.

(21) Appl. No.: 10/610,200

(22) Filed: Jun. 30, 2003

(51) Int. Cl.
*G06F 9/00* (2006.01)

(52) U.S. Cl. .......................................... 726/15; 726/13

(58) Field of Classification Search .............. 713/201, 713/171; 726/15; 380/283
See application file for complete search history.

(56) References Cited

U.S. PATENT DOCUMENTS

| | | | | |
|---|---|---|---|---|
| 6,594,268 B1 * | 7/2003 | Aukia et al. | ................ | 370/400 |
| 6,751,729 B1 * | 6/2004 | Giniger et al. | ................ | 713/153 |
| 6,845,084 B2 * | 1/2005 | Rangnekar et al. | ........... | 370/254 |
| 7,185,107 B1 * | 2/2007 | Cassar | ........................ | 709/239 |
| 2002/0016926 A1 * | 2/2002 | Nguyen et al. | ................ | 713/201 |
| 2003/0191937 A1 * | 10/2003 | Balissat et al. | ................ | 713/163 |

* cited by examiner

*Primary Examiner* — Nasser Moazzami
*Assistant Examiner* — Carlton Johnson
(74) *Attorney, Agent, or Firm* — Shumaker & Sieffert, P.A.

(57) ABSTRACT

Techniques are described for establishing network tunnels that allow communication according to one or more routing protocols. The techniques allow for the automated configuration of a selector or other filter associated with the network tunnel. A network device, for example, includes a control unit, and an interface for coupling the network device to a computer network. The control unit receives a communication to establish a network tunnel with a remote network device. The communication includes information that specifies a routing protocol supported by the remote network device. The control unit automatically configures the network tunnel to permit communication through the network tunnel in accordance with the specified routing protocol. The control unit may receive the communication in accordance with a conventional network protocol, such as the Internet Key Exchange protocol. The information may be conveyed using a data field redefined to specify the supported routing protocol.

28 Claims, 5 Drawing Sheets

AUTOMATIC CONFIGURATION OF NETWORK TUNNELS

TECHNICAL FIELD

The invention relates to computer networks and, more particularly, to communication according to routing protocols within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Conventional routers often maintain the routing information in the form of one or more routing tables or other data structures. The form and content of the routing tables often depend on the particular routing algorithm implemented by the router.

Upon receiving incoming packets, the routers examine information within the packets, and forward the packets in accordance with the routing information. In order to maintain an accurate representation of the network, routers periodically exchange routing information in accordance with routing protocols, such as the Border Gateway Protocol (BGP), the Intermediate System to Intermediate System (ISIS) protocol, the Open Shortest Path First (OSPF) protocol, and the Routing Information Protocol (RIP).

Virtual private networks (VPNs) are often used to securely share data over public network infrastructure, such as the Internet. For example, an enterprise that includes multiple geographically separated sites, each site including one or more computing devices, may establish a VPN to allow the computing devices to securely communicate through the Internet or other public network infrastructure.

A number of communication protocols have been developed for establishing a VPN. In general, these protocols allow network devices, such as routers, to establish the VPN as one or more secure data flows across the public network infrastructure. For example, the Internet Engineering Task Force has established a set of Internet Protocol Security (IPSec) protocols that make use of cryptographic technology to establish network "tunnels." These tunnels allow packets conforming to other network protocols, such as Internet Protocol (IP) packets, to be encapsulated within encrypted packet streams flowing between the sites.

In order to enhance the security of a VPN, the network devices filter network traffic at the ingress and egress of each of the tunnels associated with the VPN. For example, for IPSec tunnels, the network devices configure "selectors" that define permissible source and destination address ranges for the packets permitted through the tunnels. These selectors often require manual configuration based on the network topology and the types of routing protocols supported by the network. Moreover, many routing protocols, e.g., OSPF, BGP, and the like, make use of multicast packets, and utilize defined multicast destination address ranges to exchange routing information. In order to support communication through tunnels via these routing protocols, the selectors often need to be manually configured to support these address ranges. This process may be time consuming, and often requires significant manual labor. In addition, conventional IPSec tunnels allow only a single selector per tunnel. As a result, to support the network topology and communication via the routing protocols, an administrator may configure the selector to allow a large range of addresses, thus compromising security.

SUMMARY

In general, the invention is directed to techniques for establishing network tunnels that allow communication according to one or more routing protocols. In particular, the techniques allow for the automated configuration of a selector or other filter applied to network traffic entering or exiting the network tunnel in order to support the routing protocols. As a result, network devices may automatically establish the network tunnel without requiring manual configuration of selectors or other filters to support the routing protocols.

In accordance with the principles of the invention, while establishing a network tunnel the network devices exchange protocol selection information that specifies routing protocols supported by each of the network devices. Based on the exchanged protocol selection information, the network devices automatically configure any filters associated with the network tunnel. For example, the network device at the ingress of an IPSec tunnel may automatically configure a selector to permit ranges of addresses, e.g. multicast destination addresses, associated with the routing protocols specified by the information.

In order to easily implement the techniques, a data field of a protocol used to negotiate and establish network tunnels may be redefined to carry the protocol selection information. For example, a router may use the Internet Key Exchange (IKE) protocol to negotiate an IPSec tunnel. In this case, a field defined by the IKE protocol, such as the vendor ID field, may be redefined to carry the protocol selection information. The data field may be redefined to act as a bitmap, with each bit corresponding to a routing protocol.

In one embodiment, a method comprises receiving a communication from a network device for establishing a network tunnel. The communication includes information that specifies a routing protocol supported by the network device. The method further comprises configuring the tunnel to permit communication through the tunnel in accordance with the specified routing protocol.

In another embodiment, a network device includes a control unit, and an interface for coupling the network device to a computer network. The control unit receives a communication to establish a network tunnel with a remote network device. The communication includes information that specifies a routing protocol supported by the remote network device. The control unit automatically configures the network tunnel to permit communication through the network tunnel in accordance with the specified routing protocol.

In another embodiment, a computer-readable medium comprises instructions that cause a processor to receive protocol selection information that specifies a routing protocol supported by a remote network device. The instructions further cause the processor to establish a network tunnel with the remote network device, and automatically configure the network tunnel to allow communications through the tunnel that conform to the specified routing protocol.

In still another embodiment, a method comprises exchanging information with a network device according to a network protocol to establish a network tunnel. The information includes a data field that has been redefined to specify a set of one or more routing protocols to be supported by the network tunnel.

The invention may provide one or more advantages. For example, network device may automatically establish a network tunnel to support communication via a variety of routing protocols without requiring manual configuration of filters associated with the network tunnel. Moreover, the automated configuration of the filters may be achieved and maintained without requiring a change in central policy information that could otherwise compromise the security and throughput characteristics provided by the secure data flow.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
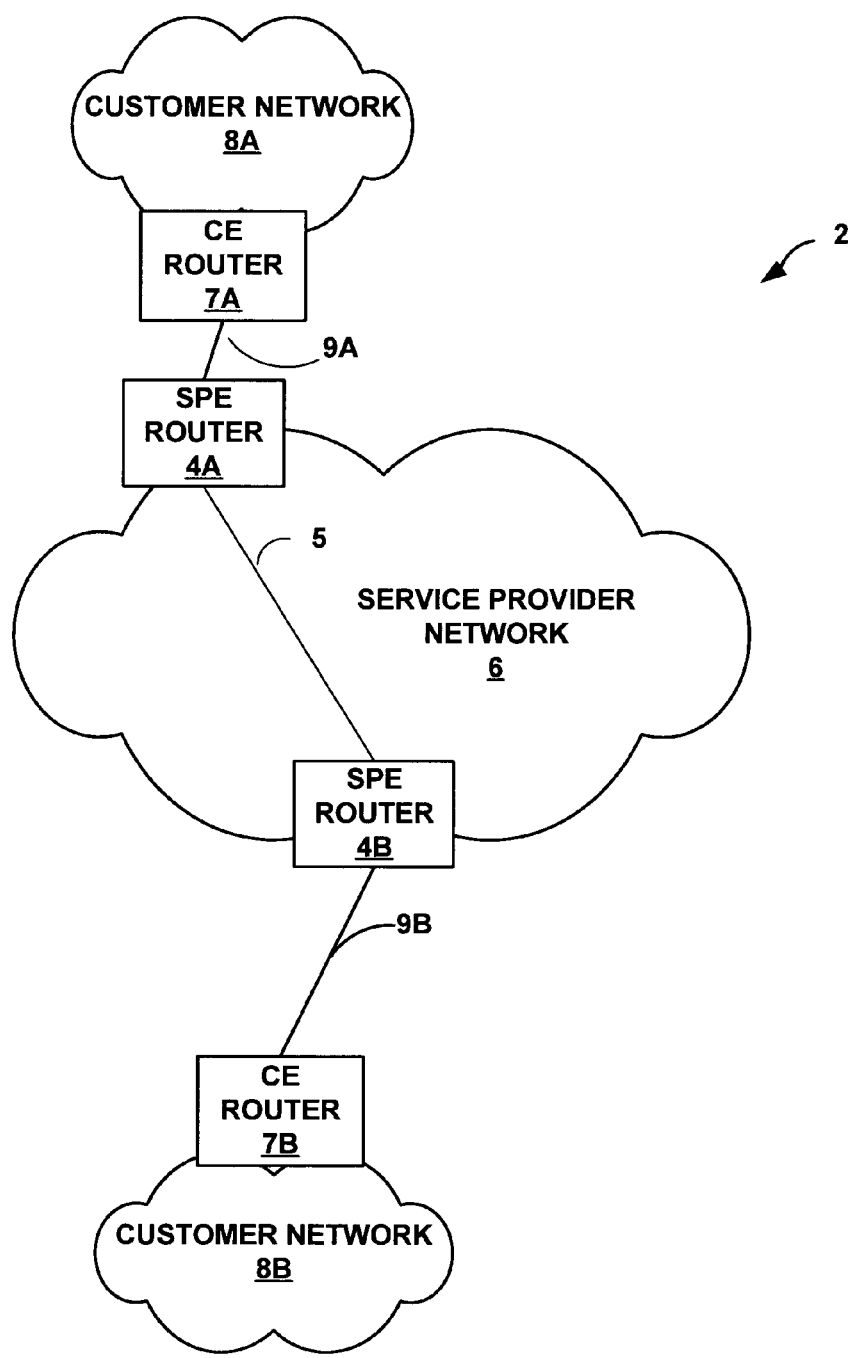
FIG. 1 is a block diagram illustrating an example network environment in which filters for network tunnels are automatically established consistent with the principles of the invention.

FIG. 1 is a block diagram illustrating an example system 2 in which provider edge routers 4A and 4B (collectively "provider edge routers 4") automatically configure filters for network tunnels 5 in accordance with principles of the invention. In the illustrated example of FIG. 1, provider edge routers 4 are edge routers of a service provider network 6 administered by a network service provider, and provide connectivity for customer networks 8A and 8B (collectively "customer networks 8"). In particular, provider edge routers 4 are coupled to customer edge routers 7A and 7B (collectively "customer edge routers 7") of customer networks 8 via access links 9A and 9B, respectively. Customer networks 8 may be networks for geographically separated sites of an enterprise. Each of customer networks 8 may include one or more computing devices (not shown), such as personal computers, laptop computers, handheld computers, workstations, servers, switches, printers, and the like.

Service provider network 6 may be coupled to one or more networks administered by other providers, and may thus form part of a large-scale public network infrastructure, e.g., the Internet. Consequently, customer networks 8 may be viewed as edge networks of the Internet. The provider may provide computing devices within customer networks 8 with access to the Internet via provider network 6, and may allow computing devices within one of customer sites 8 to communicate with computing devices in the other of customer sites 8 over the Internet. Provider network 6 may include a variety of network devices, such as routers, switches, servers, and the like.

The configuration of network environment illustrated in FIG. 1 is merely exemplary. For example, an enterprise may include any number of customer networks 8. Nonetheless, for ease of description, only customer networks 8A and 8B are illustrated in FIG. 1.

Provider edge routers 4 provide secure communications between customer networks 8 in the way of a virtual private network. In particular, provider edge routers 4 negotiate and establish one or more network tunnels 5 to securely carry network data flows across network 5. In addition, provider edge routers 4 may also negotiate network tunnels to securely carry traffic between routers 4 and routers 7 via connections 9A and 9B. Provider edge routers 4 may establish network tunnels 5 in accordance with a known network protocol, such as the Internet Key Exchange (IKE) protocol. As will be described in greater detail below, provider edge routers 4 may utilize a predefined field of the network protocol that has been redefined to exchange routing selection information that specifies routing protocols supported in the virtual private network that service provider network 6 offers to customer networks 8. Based on the exchanged routing selection information, provider edge routers 4 automatically configure filters associated with network tunnels 5 to allow communication in accordance with the specified routing protocols.

When establishing network tunnels 5, provider edge routers 4 exchange routing protocol selection information that specifies the routing protocols supported by the virtual private network offered by the service provider to the customer. The network tunnels use the routing protocol selection information exchanged upon tunnel establishment to allow routing protocol data, e.g., multicast addresses, to flow inside the tunnel. In addition, network routing information learned via the various routing protocols may also be allowed to flow within the tunnels. Based on the exchanged information, provider edge routers automatically configure filters associated with network tunnels 5 to support the specified protocols. For example, provider edge routers 7 may establish network tunnels 5 as IPSec tunnels, and may automatically configure selectors associated with the network tunnels to permit packets that conform to the specified routing protocols into the network tunnels. In particular, provider edge routers 7 automatically configure the selectors to permit packets having source and destination Internet Protocol (IP) addresses that fall within address ranges associated with the specified protocols. Consequently, provider edge routers 4 establish network tunnels 5 and the associated filters to allow routing information and other communications that conform to the specified routing protocols to flow between customer networks 8 through the network tunnels.

According to the principles of the invention, provider edge routers 4 exchange the protocol selection information by making use of a modified network protocol. In particular, a predefined field of the network protocol used to negotiate network tunnel 5 may be redefined to exchange the protocol selection information that specifies routing protocols supported in the virtual private network that service provider network 6 offers to customer networks 8. As one example, a vendor identification field defined by the IPSec protocol may be redefined to carry the protocol selection information. In conventional form, the IKE protocol defines the vendor identification field for carrying a unique identifier for a network device manufacturer. Provider edge routers 4 may utilize this field in an undefined manner to exchange protocol selection data. A remote client, e.g., a human administrator or an automated script, access provider edge routers 4 to set policy data to selectively indicate which network protocols are to be supported via network tunnels 5.

As a result, provider edge routers 4 may easily negotiate a common set of supported routing protocols. Based on the protocol selection information, provider edge routers 4 configure their respective selectors to include addresses or ranges associated with the specified routing protocols, e.g., multicast destination addresses. In this manner, the techniques reduce or eliminate the need for administrators to manually configure the filters of routers 4 in order to achieve communications through network tunnels 5 in accordance with the network protocols in the virtual private network that service provider network 6 offers to customer networks 8. As a result, the techniques may avoid significant administrative resources that otherwise would be necessary to manually maintain the filters applied by routers 4.

In addition, provider edge routers 4 may automatically update selectors as routing information is exchanged through network tunnels 5 in accordance with the routing protocols. More specifically, provider edge routes 4 may receive routing information through the tunnel via the routing protocols. The routing information typically describes a topology of customer networks 8, including routes to network destinations within the customer networks. Based on the received routing information, provider edge routers 4 automatically update the selectors to permit communication though network tunnel 5 to the destinations. The updated tunnel traffic selector may be renegotiated via a tunnel establishment protocol, e.g., the IKE protocol, or may be simply locally modified by both ends of the tunnel without further communication between the ingress and egress devices.

Although the techniques have been described in reference to provider edge routers 4, the invention is not so limited, and may be applied by any router implementing a network tunnel. For example, customer edge routers 7 or even core routers within network 6 may implement the techniques described herein.

Figure 2:
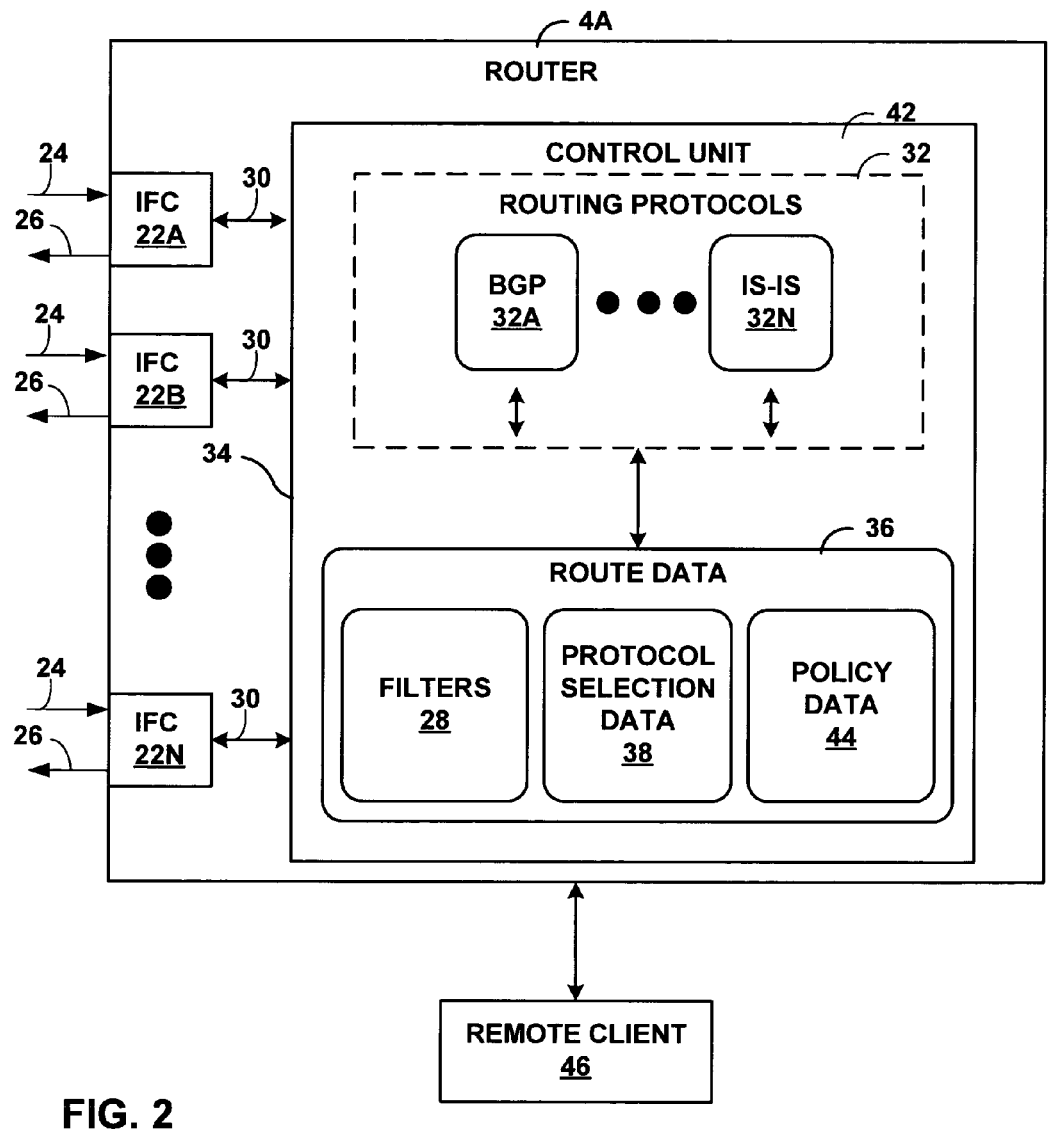
FIG. 2 is a block diagram illustrating an exemplary embodiment of a router that automatically establishes network tunnels in accordance with the principles of the invention.

FIG. 2 is a block diagram illustrating an exemplary embodiment of a router, e.g., provider edge router 4A, that automatically configures network tunnels consistent with the principles of the invention. Provider edge router 4A includes interface cards 22A-22N ("IFCs 22") that receive and send packet flows via network links 24 and 26, respectively. IFCs 22 are typically coupled to network links 24, 26 via a number of interface ports (not shown), and forward and receive packets and control information from control unit 42 via a respective interface 30. Provider edge router 4A may include a chassis (not shown) having a number of slots for receiving a set of cards, including IFCs 22. Each card may be inserted into a corresponding slot of a chassis for electrically coupling the card to a control unit 42 via a bus, backplane, or other electrical communication mechanism.

In general, provider edge router 4A receives inbound packets from network links 24, determines destinations for the received packets, and outputs the packets on network links 26 based on the destinations. More specifically, upon receiving an inbound packet via one of inbound links 24, a respective one of IFCs 22 relays the packet to control unit 24. In response, control unit 42 reads a block of data from the packet, referred to as the "key," that includes a network destination for the packet. The key may, for example, contain a routing prefix for another router within the network. Based on the destination, control unit 42 analyzes route data 36 to select a route for the packet.

Routing protocol processes 32A-32N represent software processes that implement routing protocols by which provider edge router 4A exchanges routing information with other routing devices, thereby learning the topology of the network, i.e., the routes through the network. Routing protocols may include exterior routing protocols to exchange routing information with routers of other domains or autonomous systems, e.g. BGP routing protocol. In addition, the routing protocols may include interior routing protocols, e.g., IS-IS routing protocol to learn of "internal" routes. Control unit 42 receives routing information from other routing devices in accordance with the routing protocols and, based on the routing information, provider edge router 4A generates route data 36 that describes the routes.

In addition, control unit 42 generates protocol selection data 38 that identifies which of the routing protocols are to be supported by any newly created network tunnel. Specifically, protocol selection data 38 identifies the specific network protocols, e.g., BGP, RIP, IS-IS, and the like, to be supported through the network tunnel. Control unit 42 generates protocol selection data 38 in accordance with policy data 44, which may indicate that a subset of one or more the routing protocols is to be supported by newly created tunnels. Remote client 46, e.g., a human administrator or an automated script, may set policy data 44 to selectively indicate which network protocols may be supported via the tunnels. Control unit 42 may maintain route data 36 in the form of one or more tables, databases, link lists, radix trees, databases, flat files, or any other data structures.

In accordance with the principles of the invention, control unit 42 automatically signals the supported routing protocols when establishing a network tunnel with another network device. In particular, control unit 42 negotiates with the network device to establish the network tunnel and, during this process, communicates protocol selection data 38 to indicate the network protocols that may be supported through the network tunnel.

During the negotiation, control unit 42 receives protocol selection data from the other network device, and configures the tunnel to accept packets associated with mutually supported protocols. In particular, control unit 42 establishes the tunnel with a remote device and, based on the exchanged protocol selection data 38, automatically configures filters 28 based on the supported protocols.

In one embodiment, control unit 42 may utilize a modification to a conventional protocol to easily exchange protocol selection data 38. Moreover, control unit 42 may utilize a preexisting data field, e.g., a data field defined by the conventional protocol, in an undefined manner. For example, control unit 42 may utilize the IKE protocol to negotiate and establish an IPSec tunnel. In particular, control unit 42 may invoke the IKE protocol to exchange cryptographic keys and other session information with the other network device. In conventional form, the IKE protocol defines a vendor identification field with which a device can provide a unique identifier for a manufacturer of the device. Control unit 42 may utilize this field, for example, to exchange protocol selection data 38 with the other network device, provided the other network device has been configured in a similar manner. If the other network device has not been so configured, tunnel negotiation and establishment proceeds in a conventional manner.

By utilizing protocol selection data 38, control unit 42 may automatically configure filters 28 to enable only those network addresses necessary to support the specified routing protocols or those network addresses learned to be routable in this virtual private network via the specified routing protocols. As a result, remote client 46 need not manually configure filters 28 based on the specific requirements of the tunnel to be established. In particular, control unit 42 utilizes protocol selection data 38 to adaptively configure filters 28 when establishing tunnels based on the mutually supported protocols. Consequently, the techniques may reduce the administrative resources that otherwise would be necessary to manually maintain filters 28 within control unit 42. Moreover, the techniques may be less prone to error, thereby reducing or eliminating any exposure to a network attack that may occur as a result of human error.

The architecture of provider edge router 4A illustrated in FIG. 2 is for exemplary purposes only, and the principles of the invention are not limited to this architecture. Control unit 42 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of provider edge router 4A may be implemented by executing the instructions of the computer-readable medium with one or more processors, discrete hardware circuitry, firmware, software executing on a programmable processor, or a combination of any of the above.

Figure 3:
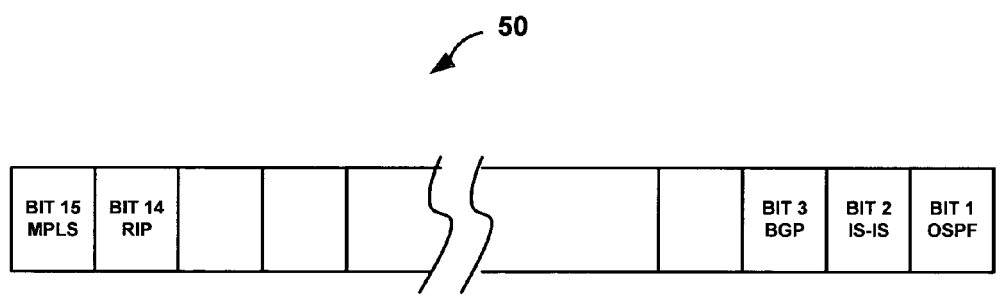
FIG. 3 illustrates an exemplary embodiment of a field of network protocol that has been redefined to specify protocol selection information.

FIG. 3 illustrates an exemplary embodiment of a field 50 of network protocol packet modified to act as a protocol selection information field. Field 50 may, as shown in FIG. 3 be a field, such as the vendor identification field defined by the IKE protocol. In order for field 50 to act as a protocol selection information field, control unit 28 (FIG. 2) redefines field 50 to act as a bitmap in which each bit corresponds to a different routing protocol. During negotiation of a network tunnel, control unit 28 indicates routing protocols supported by provider edge router 4A (FIG. 2) to a remote network device by selectively setting the respective bits of field 50.

Field 50 is illustrated for exemplary purposes, and the protocol selection information may be readily communicated in other forms. For example, protocol selection information field is not limited to a vendor identification field of an IKE protocol packet. Other fields may be redefined or new fields may be defined to carry the protocol information. Further, although the FIG. 3 shows a field, the protocol selection information field may include any number of bits, and may not be used as a bitmap.

Figure 4:
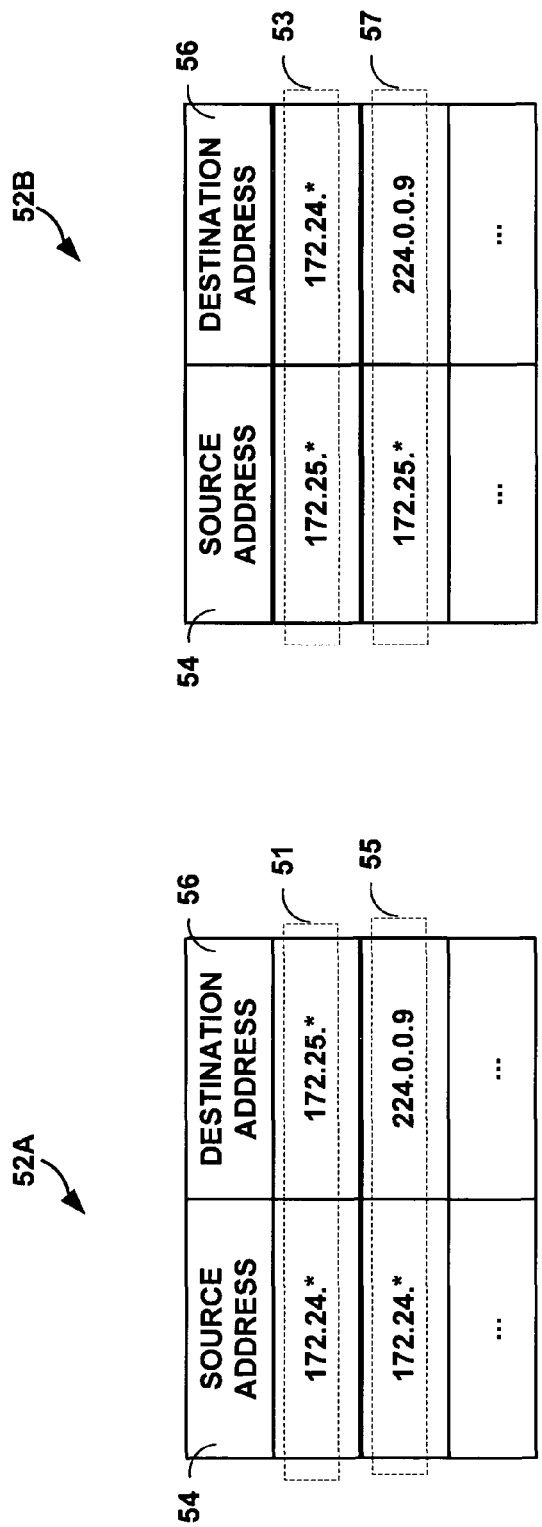
FIG. 4 is an exemplary configuration of a filter used by a router to restrict access to a network tunnel.

FIG. 4 is an exemplary configuration of two IPSec selectors 52A and 52B (collectively "IPSec selectors 52") for each direction of a network tunnel as automatically configured by a router in accordance with the principles of the invention. As illustrated in FIG. 4, IPSec selectors 52 may be maintained as data structures that define criteria specifying which packets are permitted within an associated network tunnel. In the illustrated example, IPSec selectors 52 store origin and destination address prefixes. The router applies IPSec selectors 52 to allow those packets that have source-destination address pairs that fall within the source-destination prefixes specified within the IPSec selector. IPSec selectors 52 can be further modified as routing information is learned by the routing application instance on the virtual private network on which the IPsec tunnel is a member.

In this example, the illustrated address prefixes 172.24.* and 172.25.* may correspond to address ranges assigned to customer networks, e.g., customer networks 8A and 8B of FIG. 1, respectively. Consequently, IPSec selectors 52 may be maintained by one of provider edge routers 4 for an associated one of network tunnels 5. In this case, the first entry 51 of IPSec selector 52A allows those packets that originated by the routing application on edge routers 4 and that are destined for a device within customer network device 8B. Similarly, entry 53 of IPSec selector 52B allows those packets that originated by the routing application on edge routers 4 and are destined for a device within customer network device 8A. These entries 51, 53 may be manually configured by an administrator or automated script.

Entries 55, 57 of IPSec selector 52A and 52B, respectively, correspond to routing protocols supported by the network tunnel and, in accordance with the principles of the invention, are automatically configured during the negotiation of the associated one of network tunnels 5. For example, the indicated multicast destination address 224.0.0.9 may be a multicast destination address used by network devices to communicate according to a routing protocol supported by the virtual private network. In particular, entry 55 allows those packets that originated by the routing application on edge routers 4 and are destined the multicast address 224.0.0.9 associated with the routing protocol. Entry 55 allows those packets that originated by the routing application on edge routers 4 and are destined the multicast address 224.0.0.9 associated with the routing protocol. In this manner, devices within different ones of customer networks 8 may communicate with each other through the network tunnel in accordance with the routing protocol. As a result, the devices may readily exchange routing information through the tunnel. Control units 28 (FIG. 2) for both of provider edge routers 4 automatically configure entries 55, 57 of respective copies of IPSec selectors 52 based on the protocol selection information exchanged in the manner described above.

Figure 5:
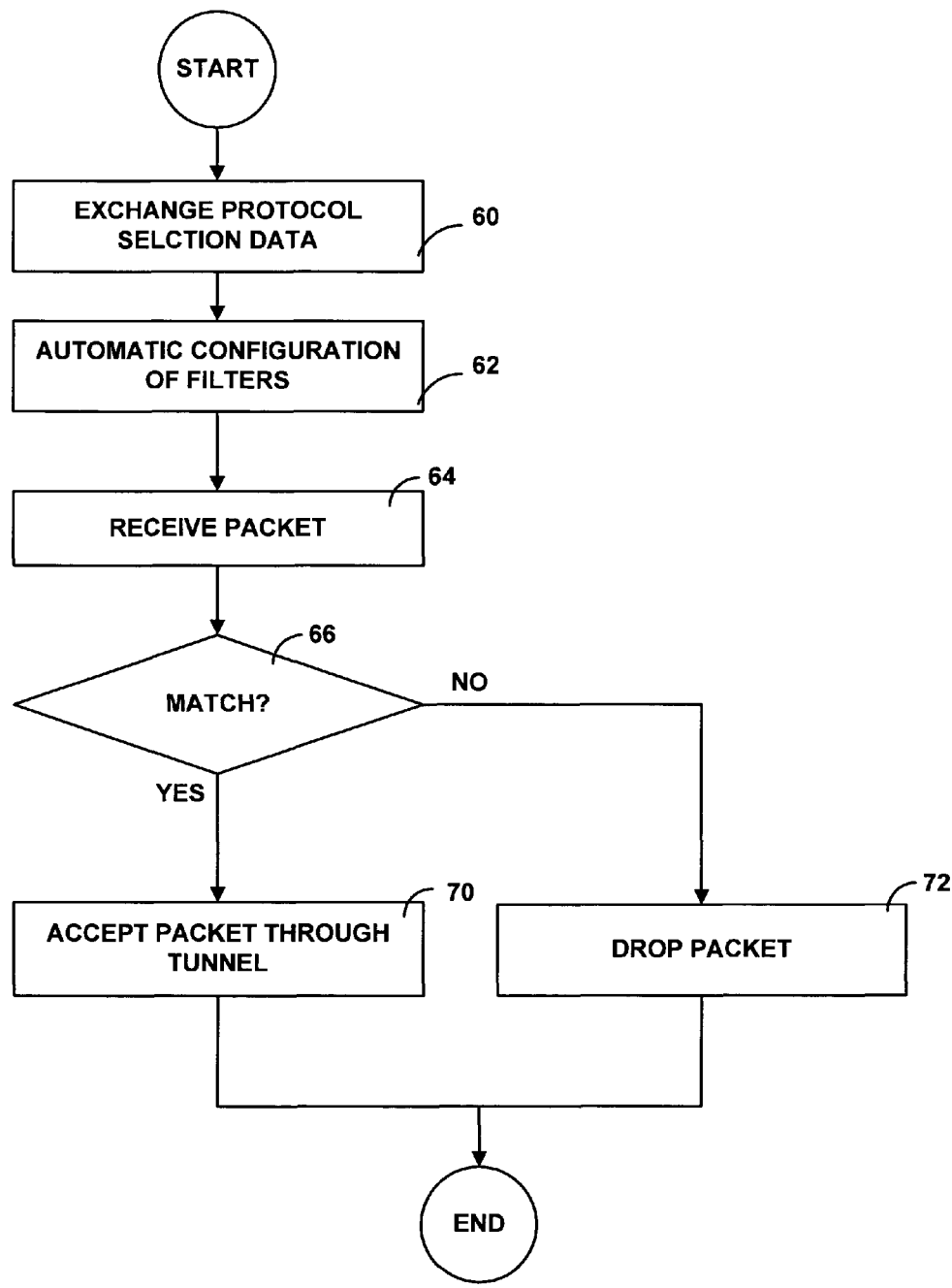
FIG. 5 is a flow diagram illustrating exemplary operation of a router in accordance with the principles of the invention.

FIG. 5 is a flow diagram illustrating example operation of a router in accordance with the principles of the invention. For exemplary purposes, the flow diagram of FIG. 5 will be explained in reference to FIG. 1 and, in particular, provider edge routers 4.

Initially, provider edge router 4A negotiates one of network tunnels 5 with provider edge router 4B according to a network protocol 36. For example, provider edge routers 4 may negotiate an IPSec tunnel in accordance with the IKE protocol. During this negotiation, provider edge routers 4 exchange protocol selection information with the provider edge router 4B (60). As described above, provider edge routers 4 may communicate the protocol selection data to each other by redefining a data field of a conventional protocol used to negotiate and establish the network tunnel. For example, provider edge routers 4 may make use of a vendor ID field defined by the IKE protocol, and may redefine the field to carry a bitmap that identifies routing protocols supported by the provider edge routers.

Based on the exchanged protocol selection data, provider edge router 4A configures an IPSec selector, e.g., IPSec selector 52 of FIG. 4, to permit communication according to the specified routing protocols through the one of network tunnels 5 being established (62). Router 4 may, for example, modify IPSec selector 52 to include multicast destination addresses used to communicate according to the specified routing protocols.

Upon receiving an inbound packet (64), provider edge router 4A determines whether the source-destination address pair of the inbound packet matches an entry in IPSec selector 52 (66). If the source-destination address pair matches an entry within IPSec selector 52, provider edge router 4A forwards the packet via the one of network tunnels 5 associated with the selector (70). If a match is not found, provider edge router 4A filters the packet, i.e., drops the packet and does not forward the packet via the associated one network tunnels 5 (72).

In this manner, provider edge router 4A automatically configures IPSec selector 52 when establishing one of network tunnels 5 in accordance with protocol selection information exchanged with provider edge router 4B. In this manner, provider edge router 4A automatically configures the established one of network tunnels 5 to allow routing information and other communications to flow through the network tunnel in accordance with one or more routing protocols supported by provider edge routers 4. The automated configuration of the filters may be achieved and maintained without requiring a change in central policy information that could otherwise compromise the security and throughput characteristics provided by the secure data flow. Various embodiments of the invention have been described. These and other embodiments are within the scope of the following claims.

The invention claimed is:

1. A method for establishing and configuring a network tunnel from an ingress router coupled to a first customer network to an egress router coupled to a second customer network, the method comprising:
receiving, with the ingress router, a communication from the egress router in accordance with a tunnel establishment network protocol for establishing a network tunnel from the ingress router to the egress router, wherein the communication of the tunnel establishment network protocol includes a data field that has been redefined to specify at least one routing protocol that is supported by a router within the second customer network coupled to the egress router, wherein the data field includes a bitmap having a set of bits, wherein each bit is associated with a respective routing protocol;
when establishing the network tunnel with the ingress router, automatically configuring the network tunnel with the ingress router to permit communications to enter the network tunnel that conform to the specified routing protocol by:
(1) based on the routing protocol specified within the data field of the communication of the tunnel establishment network protocol, automatically identifying with the ingress router at least one routing protocol mutually supported by a router within the first customer network coupled to the ingress router and the router within the second customer network coupled to the egress router,
(2) automatically identifying with the ingress router one or more destination network addresses that are used by the mutually supported routing protocol, and
(3) automatically configuring a selector at the ingress router to permit routing protocol communications through the network tunnel that have the one or more destination network addresses used by the mutually supported routing protocol; and
after establishing the network tunnel, permitting the routing protocol communications exchanged between the first customer network and the second customer network to enter the network tunnel to communicate routing information through the network tunnel via the mutually supported routing protocol, wherein the routing information defines at least one route to a network destination.

2. The method of claim 1, wherein the tunnel establishment network protocol is an Internet Key Exchange (IKE) protocol.

3. The method of claim 2, wherein the data field is a vendor identification field defined by the IKE protocol and redefined to specify the routing protocol.

4. The method of claim 1, wherein the network tunnel is a packet-based network tunnel.

5. The method of claim 4, wherein the network tunnel is an Internet Protocol Security (IPSec) protocol tunnel.

6. The method of claim 1, wherein the destination network address is a multicast address associated with the mutually supported routing protocol.

7. The method of claim 1, further comprising:
after the tunnel is established, receiving, at the egress router, routing information through the network tunnel via the mutually supported routing protocol, wherein the routing information defines a route to a network destination; and
renegotiating selectors associated with the network tunnel with the ingress router using the tunnel establishment network protocol to automatically update the network tunnel to permit communication through the network tunnel to the network destination.

8. The method of claim 1, further comprising:
after establishing the network tunnel, receiving, with the ingress network device, a routing protocol message from the first customer network;
determining whether the routing protocol message conforms to the specified routing protocol;
when the routing protocol message conforms to the specified routing protocol, forwarding the routing protocol message through the network tunnel; and
when the routing protocol message does not conform to one of the specified routing protocols, preventing the routing protocol message from entering the network tunnel.

9. The method of claim 1, further comprising:
identifying a source network address range for network devices within the first customer network;
identifying a multicast address range for the supported routing protocol; and
when establishing the network tunnel, automatically configuring the network tunnel to allow through the network tunnel routing protocol messages that originate from a source network address within the identified source network address range and are destined to a destination network address within the multicast address range.

10. An ingress router coupled to a first customer network comprising:
an interface coupled a computer network; and
a control unit configured to receive a communication via the interface in accordance with a tunnel establishment network protocol to establish a network tunnel with a remote egress router coupled to a second customer network, wherein the communication of the tunnel establishment network protocol includes a data field that has been redefined to specify a routing protocol supported by a router within the second customer network coupled to the remote egress router, wherein the data field includes a bitmap having a set of bits, wherein each bit is associated with a respective routing protocol, and
wherein the control unit automatically configures the network tunnel when establishing the network tunnel to permit routing protocol communications to enter the network tunnel that conform to the specified routing protocol by automatically configuring a selector at the ingress router to permit routing protocol communications through the network tunnel that include multicast destination network addresses associated with the specified routing protocol supported by the router within the second customer network coupled to the egress router, and
wherein, after establishing the network tunnel, the control unit communicates routing information exchanged between the first customer network and the second customer network through the network tunnel via the specified routing protocol and the routing information defines a route to a network destination.

11. The router of claim 10, wherein the tunnel establishment network protocol is an Internet Key Exchange (IKE) protocol.

12. The router of claim 11, wherein the data field is a vendor identification field defined by the IKE protocol.

13. The router of claim 10, wherein the network tunnel is a packet-based network tunnel.

14. The router of claim 13, wherein the network tunnel is an Internet Protocol Security (IPSec) protocol tunnel.

15. The router of claim 10, further comprising a memory to store the selector.

16. The router of claim 10, wherein the destination address associated with the specified routing protocol is a multicast address.

17. The router of claim 10, wherein, upon a renegotiation of the network tunnel with the egress router using the tunnel establishment network protocol, the control unit automatically updates selectors associated with the network tunnel to permit communication through the network tunnel to the network destination.

18. A non-transitory computer-readable storage medium comprising instructions that cause a processor to:
receive, with an ingress router associated with a first customer network, a communication that conforms to a network protocol for establishing a network tunnel and that includes a data field that has been redefined to specify a routing protocol supported by a router within a second customer network coupled to a remote egress router, wherein the data field includes a bitmap having a set of bits, wherein each bit is associated with a respective routing protocol;
establish a network tunnel from the ingress network device to the remote egress router;
when establishing the network tunnel, automatically configure the network tunnel with the ingress router to allow routing protocol communications exchanged between the first customer network and the second customer network through the network tunnel that conform to the specified routing protocol by automatically configuring a selector at the ingress router that identifies source and destination network addresses for communications permitted through the network tunnel to include destination network addresses associated with the specified routing protocol supported by the router within the second customer network associated with the egress router; and
after establishing the network tunnel, receive routing information exchanged between the first customer network and the second customer network through the network tunnel via the specified routing protocol, wherein the routing information defines a route to a network destination.

19. The non-transitory computer-readable storage medium of claim 18, wherein the network protocol is an Internet Key Exchange (IKE) protocol.

20. The non-transitory computer-readable storage medium of claim 19, wherein the data field is a vendor identification field defined by the IKE protocol and redefined to specify the routing protocol.

21. The non-transitory computer-readable storage medium of claim 18, wherein the network tunnel is a packet-based network tunnel.

22. The non-transitory computer-readable storage medium of claim 21, wherein the tunnel is an Internet Protocol Security (IPSec) protocol tunnel.

23. The non-transitory computer-readable storage medium of claim 18, wherein the destination network address is a multicast address associated with the specified routing protocol.

24. A method comprising:
exchanging information with a router according to a network protocol to establish a network tunnel, wherein the information includes a data field that has been redefined to specify a set of one or more routing protocols to be supported by the network tunnel, wherein the network protocol is an Internet Key Exchange (IKE) protocol, wherein the data field is a vendor identification field defined by the IKE protocol and redefined to specify the routing protocol, wherein the data field includes a bitmap, each bit of the bitmap associated with one of a plurality of protocols and one of the bits of the bitmap associated with the specified routing protocol; and
configuring the network tunnel to allow communications through the tunnel that conform to the specified routing protocol, wherein configuring the network tunnel comprises configuring a selector to identify permit communications that specify a destination network address associated with the specified routing protocol.

25. The method of claim 24, wherein the network tunnel is a packet-based network tunnel.

26. A method for establishing and configuring a network tunnel from an ingress network device coupled to a first customer network to an egress network device coupled to a second customer network, the method comprising:
receiving, with the ingress network device, a communication from the egress network device for establishing a network tunnel from the ingress network device to the egress network device, wherein the communication includes information that specifies a routing protocol supported by a router within the second customer network coupled to the egress network device, wherein the data field includes a bitmap having a set of bits, wherein each bit is associated with a respective routing protocol; and
when establishing the network tunnel with the ingress network device, automatically configuring the network tunnel with the ingress network device to permit routing protocol communications to enter the network tunnel that conform to the specified routing protocol by configuring a selector that identifies source and destination network addresses for communications permitted through the network tunnel to include a destination network address coupled to the specified routing protocol.

27. The method of claim 26, wherein the network device is a router.

28. A system comprising:
a first provider edge (PE) router;
a second PE router coupled to the first PE router by an intermediate provider network;
a first customer router coupled to a first customer network, wherein the first customer network is also coupled to the first PE router; and
a second customer network coupled to a second customer network, wherein the second customer network is also coupled to the second PE router;
wherein the second PE router is configured to transmit a tunnel establishment network protocol communication for establishing a network tunnel from the first PE router to the second PE router, wherein the tunnel establishment network protocol communication includes a data field that has been redefined to specify at least one routing protocol that is supported by a router within the second customer network, wherein the data field includes a bitmap having a set of bits, wherein each bit is associated with a respective routing protocol, wherein the first PE router is configured to, while establishing the network tunnel from the first PE router to the second PE router, automatically configure the network tunnel to permit communications to enter the network tunnel that conform to the specified routing protocol, and wherein based on the automatic configuration the first PE router is configured to, after establishing the network tunnel, permit routing protocol communications to be exchanged between the first customer network and the second customer network through the network tunnel to communicate routing information through the network tunnel via the mutually supported routing protocol, wherein the routing information defines at least one route to a network destination.

* * * * *